A. FASSETT & G. NEWTON.
HARROW.
No. 173,400. Patented Feb. 15, 1876.
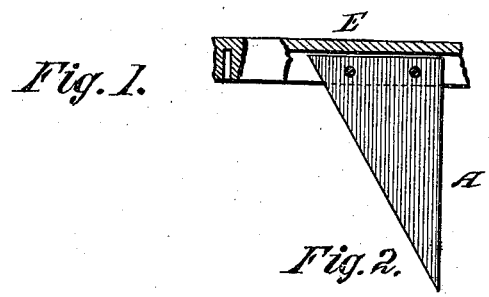
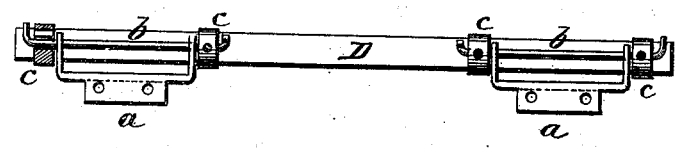
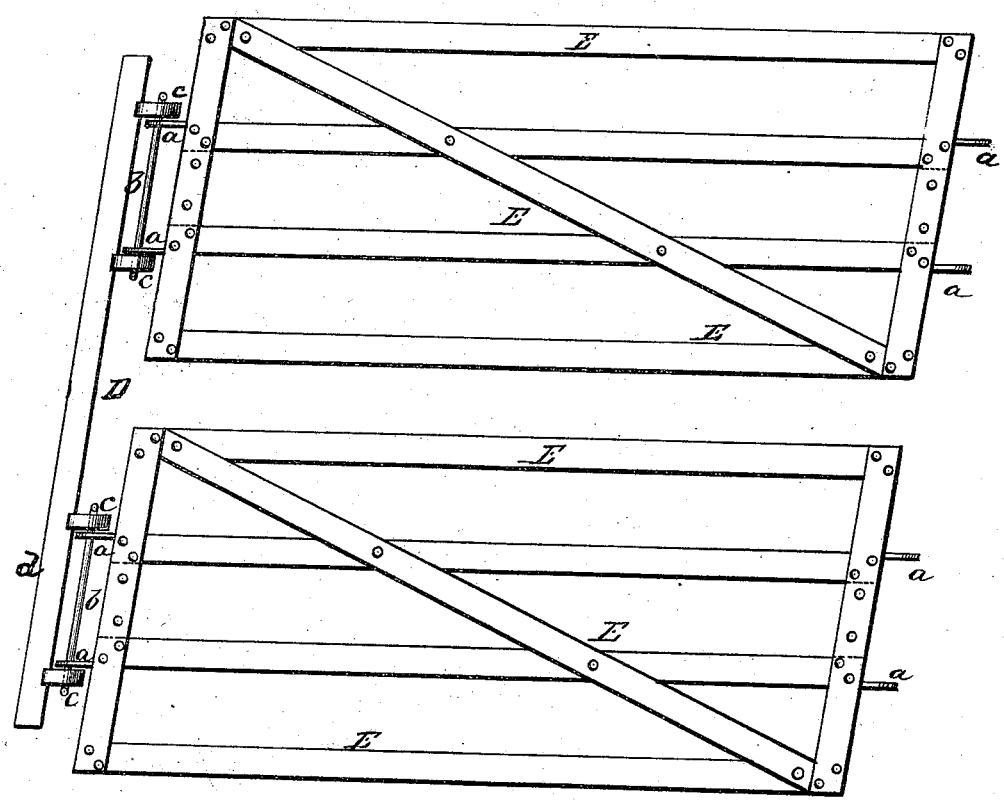
Witnesses:
P. C. Dieterich
T. H. Duffy
Inventors:
Amos Fassett
George Newton

UNITED STATES PATENT OFFICE.

AMOS FASSETT AND GEORGE NEWTON, OF STERLING, ILLINOIS.

IMPROVEMENT IN HARROWS.

Specification forming part of Letters Patent No. 173,400, dated February 15, 1876; application filed December 8, 1875.

*To all whom it may concern:*

Be it known that we, AMOS FASSETT and GEORGE NEWTON, of Sterling, in the county of Whitesides and State of Illinois, have invented a new and useful Improvement in Harrows, which improvement is fully set forth in the following specification, reference being had to the accompanying drawings.

One object of our invention is to provide a harrow-tooth whose front edge shall be perpendicular when the harrow is drawn in one direction, and shall slant backward when the harrow is drawn in the opposite direction, and whose front or cutting edge, in both instances, shall be an acute bevel-angle.

These teeth are placed in the sections with their perpendicular edges in one direction. The beams of the sections are prepared for the teeth by being run over a circular saw, which cuts a groove longitudinally in the lower side of the beams far enough to give a firm seat for the teeth. The teeth are then placed in the groove, and fastened by two rivets or bolts passing laterally through each tooth and through the beam.

The advantage of cutting the beam only on the lower side is, that the upper part of the beam being an entirety, the water is prevented from getting into the groove and rotting the beams.

Figure 2 shows the hounds $a$ $a$ as attached to draw-bar by the longitudinal bolts $b$ $b$ passing through the eye in the large-headed bolts $c$ $c$ $c$ $c$ in the draw-bar. Fig. 3 is a plan view of a harrow embodying our invention.

D is the ordinary draw-bar, and E E are sections of a harrow. The hounds $a$ $a$ are placed on each end of the two inner beams of each section, so that the draw-bar may be attached to either end of the sections. The hounds $a$ $a$ are placed between the bolt-heads $c$ $c$ and $c$ $c$, and the bolts $b$ $b$ passed through the latter and the hounds $a$ $a$, making pivotal joints. The hole in the bolt-head $c$ is elongated upward, and the bolts $b$ are made with a small projection upon one side at one end, and part of the bolt at the other end to form a head is bent laterally, to about a right angle, toward the same side upon which the aforesaid projection is made at the other end.

In putting in the bolt, the projection is passed through the upward elongation of the hole in the bolt-heads $c$ $c$, and when entirely in the weight of the bent head, being upon one side of the bolt, turns and holds by its gravity the projection downward, so that it is impossible for the projection on the bolt $b$ to return of itself through the bolt-head $c$, because it cannot turn upward—a position necessary to its withdrawal. The hounds $a$ $a$ are slotted vertically at each end to allow the sections a twisting or undulatory motion.

The superiority of the tooth A consists in the fact that by reversing the sections, as aforesaid, it combines in one tooth a perpendicular tooth for deep stirring, and a slanting one for shallow stirring of the ground, as may be desired in either instance. In addition the tooth has a cutting-edge, which makes the draft less, and renders the tooth less liable to become clogged.

The line of draft is diagonally across the sections, and of course the teeth pass through the ground obliquely, throwing the earth similarly to the mold-board of a plow.

The team may be hitched to the draw-bar at such point as will give the lateral inclination desired to the teeth. The point marked $d$ will be found satisfactory, and the draft applied there will align the teeth so that they will not follow in the path of each other.

The number of sections may be increased at will.

We make no claim upon the draw-bar or sections generally; but

What we claim as our invention in a harrow is—

1. In combination with the grooved beams of the harrow, the angular teeth A, rigidly fastened thereto, to operate obliquely to the line of draft, substantially as and for the purpose described.

2. The hounds $a$, bolt $b$, and bolt-heads $c$, constructed and operating substantially as and for the purpose mentioned.

AMOS FASSETT.
GEORGE NEWTON.

Witnesses:
W. SCOTT WARD,
JOHN W. ALEXANDER.